United States Patent [19]

Sasaki et al.

[11] Patent Number: 4,507,423

[45] Date of Patent: Mar. 26, 1985

[54] MODIFIED POLYOLEFIN COMPOSITE MATERIAL WITH IMPROVED PROPERTIES

[75] Inventors: Isao Sasaki, Hiroshima; Yasuaki Ii, Otake; Hiroshi Mori, Iwakuni, all of Japan

[73] Assignee: Mitsubishi Rayon Co., Ltd., Tokyo, Japan

[21] Appl. No.: 450,386

[22] Filed: Dec. 16, 1982

[30] Foreign Application Priority Data

Jun. 29, 1982 [JP] Japan ................... 57-112428

[51] Int. Cl.$^3$ .................. C08K 5/14; C08K 3/00; C08L 51/08
[52] U.S. Cl. ...................... 524/427; 525/66; 525/263; 525/265; 525/285; 525/301; 524/433; 524/445; 524/447; 524/449; 524/451; 524/531; 524/536
[58] Field of Search ............. 524/531, 536, 427, 433, 524/445, 447, 449, 451; 525/263, 265, 301, 257, 66, 285

[56] References Cited

U.S. PATENT DOCUMENTS

| | | | |
|---|---|---|---|
| 3,751,397 | 8/1973 | Muto | 524/331 |
| 3,862,265 | 1/1975 | Steinkamp et al. | 524/279 |
| 3,882,194 | 5/1975 | Krebaum | 525/301 |
| 4,338,228 | 7/1982 | Inoue et al. | 524/120 |
| 4,382,128 | 5/1983 | Li | 524/513 |

FOREIGN PATENT DOCUMENTS 62252 10/1982 Japan .

Primary Examiner—Carman J. Seccuro
Attorney, Agent, or Firm—Oblon, Fisher, Spivak, McClelland & Maier

[57] ABSTRACT

A polyolefin resin composition comprising a modified polyolefin prepared by reacting a polyolefin with an unsaturated carboxylic acid in the presence of a catalyst including at least one member selected from the group consisting of ketal peroxides and dialkyl peroxides having a decomposition temperature necessary for attaining the half life of 10 hours of at least 80° C., and a fibrous, powdery, or flaky reinforcement.

10 Claims, No Drawings

MODIFIED POLYOLEFIN COMPOSITE MATERIAL WITH IMPROVED PROPERTIES

FIELD OF THE INVENTION

The present invention relates to a composite material having excellent mechanical and electrical properties.

DESCRIPTION OF THE PRIOR ART

Thermoplastic composite materials have excellent mechanical and electrical properties, and investigations for use as industrial materials have recently been developed rapidly. Of polymers constituting the composite materials, polyolefins such as polyethylene, polypropylene, and so forth have characteristics of small specific gravity, good moldability and processability, excellent chemical resistance, and so forth and application of the thermoplastic composite materials comprising polyolefins as a matrix will now increase. However, since polyolefins constituting the thermoplastic composite materials are nonpolar polymers, they do not have a sufficient affinity for glass fibers, carbon fibers, carbon black, mica, talc, alumina fibers, silicon carbide fibers, aromatic polyamide fibers, and so forth which are used as a reinforcement. Therefore, a thermoplastic composite material having a further improved reinforcing effect has been demanded.

Many investigations have been made to develop a thermoplastic composite material satisfying the above requirement.

For example, Japanese Patent Application (OPI) No. 74649/1977 (the term "OPI" as used herein refers to a "published unexamined Japanese patent application") describes a material prepared by adding 0.2 to 2 wt% of polyacrylic acid to a composite material composed of 50 to 95 parts by weight of a polyolefin and 5 to 50 parts by weight of an inorganic filler. However, this composite material cannot be said to possess sufficiently improved properties because the affinity of the polyolefin for the inorganic filler has not yet been improved. Japanese Patent Application (OPI) No. 50041/1980 discloses a composite material comprising carbon fibers and a graft polyolefin obtained by graft-polymerizing an unsaturated carboxylic acid, such as acrylic acid, methacrylic acid, or maleic acid, onto a polyolefin. Although this composite material has considerably improved affinity of the graft polyolefin for carbon fibers, its fabrication properties are insufficient. Thus, this composite material is not also considered to have sufficient properties.

U.S. Pat. No. 3,862,265 discloses a composite material composed of a graft polyolefin and an inorganic filler which is obtained by blending an unsaturated carboxylic acid, a polyolefin, and an inorganic filler, subjecting the blend to a reaction under heating and mixing such in an extruder. This composite material has good affinity of the graft polyolefin for the inorganic filler, but has unsatisfactory fluidity since it contains inorganic fibers. Consequently, this composite material has not sufficient moldable properties particularly in producing a molded product having thin-walled parts and a large-sized molded product. Therefore, a thermoplastic composite material having improved fabrication properties has strongly been demanded.

SUMMARY OF THE INVENTION

The present invention provides a thermoplastic composite material having excellent moldability and which can provide a molded product having excellent mechanical and electrical properties, small specific gravity, and good water repellency.

The present invention also provides a composite material having good moldability by using a catalyst having a decomposition temperature necessary for attaining the half life of 10 hours of at least 80° C.

The present invention also provides a composite material having improved impact strength and good affinity of the thermoplastic for a reinforcement by using a mixed catalyst system of the above specific catalyst and benzoyl peroxide.

DETAILED DESCRIPTION OF THE INVENTION

Polyolefins used in the present invention must be modified with an unsaturated carboxylic acid to have good affinity thereof for a reinforcement which is one component of the composite material of the present invention. A modified polyolefin used in the present invention is prepared by graft-polymerizing an unsaturated carboxylic acid onto a polyolefin. The graft polymerization is conducted using a peroxide catalyst having a decomposition temperature necessary for attaining the half life of 10 hours of at least 80° C. This catalyst is indispensable to improve the moldability, particularly the flowability, of a composite material comprising a modified polyolefin and a reinforcement.

Catalysts having such properties are ketal peroxides and dialkyl peroxides, and specific examples thereof include 1,1-bis(t-butylperoxy)-3,3,5-trimethyl cyclohexane (decomposition temperature: 90° C.), 1,1-bis(t-butylperoxy)cyclohexane (91° C.), n-butyl-4,4-bis(t-butylperoxy)valerate (105° C.), 2,2-bis(t-butylperoxy)-butane (103° C.), 2,2-bis(t-butylperoxy)octane (101° C.), di-t-butylperoxide (124° C.), t-butylcumylperoxide (120° C.), di-cumylperoxide (117° C.), $\alpha,\alpha'$-bis(t-butylperoxyisopropyl)benzene (113° C.), 2,5-dimethyl-2,5-di(t-butylperoxy)hexane (118° C.), and 2,5-dimethyl-2,5-di(t-butylperoxy)hexyne-3 (135° C.).

A modified polyolefin prepared using the catalyst having a decomposition temperature necessary for attaining the half life of 10 hours of at least 80° C. can effectively lower the molecular weight of the polyolefin in a modification reaction process and give a composite material hving better moldability than that of a composite material prepared using other catalysts.

In the modification reaction of polyolefins, the peroxide type catalyst is used in an amount of 0.03 to 3 parts by weight, preferably 0.05 to 1 part by weight, per 100 parts by weight of the polyolefin. Excess amounts of the catalyst used give rise to an unnecessary lowering of the molecular weight of the polyolefin, making it impossible for the polyolefin to give a composite material having good mechanical and chemical properties.

It is preferred in the present invention to use a specific amount of benzoyl peroxide in addition to the ketal or dialkyl peroxides above in order to improve the impact strength of a molded product prepared from the composite material. Benzoyl peroxide is preferably used in the weight ratio of 1/10 to 10/1, preferably 1/6 to 6/1, to the above ketal or dialkyl peroxides. A modified polyolefin prepared using such a mixed catalyst system including benzoyl peroxide in the specific weight ratio can have a microcrystalline structure and, as a result, a molded product prepared from the composite material containing such modified polyolefin has improved impact strength.

The modified polyolefin prepared using a mixed catalyst system of the ketal or dialkyl peroxides and benzoyl peroxide have smaller size of spherulites (viz., 50μ or less, preferably 5 to 30μ, whereas the original size of the polyolefin is 100μ or more) which are caused during molding as compared with a modified polyolefin prepared using only the ketal or dialkyl peroxides. This contributes to the improvement of an impact resistance in a molded product prepared from the composite material of the present invention.

Specific examples of polyolefins used in the present invention include polyethylene, polypropylene, poly(4-methyl-pentene-1), ethylene/vinyl acetate copolymer, ethylene/ethyl acrylate copolymer, and ethylene/propylene/diene copolymer. Of those polyolefins, polypropylene is preferred.

Specific examples of the unsaturated carboxylic acids used as a modifier for the polyolefins include acrylic acid, methacrylic acid, itaconic acid, maleic acid, and acid anhydrides of these acids. The amount of these unsaturated carboxylic acids used is 0.05 to 0.8 part by weight, preferably 0.1 to 0.6 part by weight, per 100 parts by weight of the polyolefin. Too large amount of the modifier is not preferred because the unreacted modifier remains in the composition during the modification reaction process.

Reaction conditions for the reaction of the polyolefins, unsaturated carboxylic acids, and peroxides are a temperature of 150° to 280° C. and a reaction time of 1 to 20 minutes. When a reaction temperature and/or a reaction time exceed(s) the above range(s), unfavorable phenomena such as unnecessary coloring of the modified polyolefin obtained and unnecessary lowering of the molecular weight of the polyolefin cause and the preparation of a thermoplastic material having favorable characteristics becomes difficult.

A method wherein a solution is used as a reaction medium, a method wherein reaction is conducted in a heat-melting state without the use of a solvent, and a method wherein reaction is conducted in a heat-melting state with the use of an extruder as a reactor can be employed as a modification reaction process for the polyolefin. Of those method, the method using an extruder as a reaction is the most preferred method from the standpoints of unnecessary coloring of the modified polyolefin obtained, abnormal lowering of the molecular weight of the polyolefin, and the appropriate selection of the modification reaction time. The one reason is that the desired modified polyolefin can be obtained by the use of the minimum amounts of the modifier and the peroxide to the polyolefin and the other reason is that the efficiency of the modification reaction is high whereby modified polyolefin having the uniform modified ratio can be obtained.

In preparing the thermoplastic composite material of the present invention using the extruder as a reactor, predetermined amounts of the polyolefin, modifier and peroxide, and if desired, a small amount of a low-boiling point solvent such as aromatic solvents, e.g., alcohols, acetone, toluene, and xylene, are uniformly blended in a mixer such as the Henschel mixer at room temperature, the resulting blend is fed into an extruder as a reactor and melt-mixed under appropriate conditions of temperature and time and the low-boiling point solvent and the excess modifier are removed through a vent portion of the extruder, thereby providing the desired modified polyolefin. The modified polyolefin thus-prepared is blended with predetermined amounts of reinforcement and, if necessary, other thermoplastic in an extruder, and the resulting blend is molded into pellets by extruding it from the extruder to give the composite material of the present invention.

Specific examples of the reinforcement include powdery materials such as glass flakes, talc, calcium carbonate, magnesium oxide, clay, mica, and carbon black; and fibrous materials such as glass fibers, carbon fibers, potassium titanate fibers, asbestos fibers, graphite fibers, silicon carbide fibers, alumina fibers, boron fibers, and aromatic polyamide fibers. A fiber reinforcement having a length of 5 mm or less, preferably 0.03 to 3 mm, is preferred from the standpoint of moldability of the composite material of the present invention. It is preferred for the composite material of the present invention to be the amount of the reinforcement being the range of 5 to 80 wt% based on the from the standpoint of exhibition of a reinforcing effect due to reinforcement and moldability of the composite material.

Other thermoplastic resins which can be additionally incorporated into the composite material of the present invention include engineering plastics such as polyamides, polyesters, polycarbonates, polyethers, polyacetals, polysulfones, and polyphenylsulfones. These thermoplastic resins are appropriately selected and combined depending on the end use of the composite material of the present invention.

The present invention will now be explained in detail by reference to the following non-limiting examples. Unless otherwise indicated, all percents, parts, ratios and the like are by weight.

EXAMPLE 1

To 100 parts by weight of polypropylene powders having an inherent viscosity of 1.5 (measured in a tetralin solution at 135° C.) were added modifiers and peroxides as shown in Table 1, and the mixture was blended in a Henschel mixer. The mixture was then fed into an extruder reactor of 30φ and L/D=25, and modified in a mixed state under heat-melting at a reaction temperature of 230° C. for a reaction time of 7 minutes. The unreacted modifier was removed by reducing the pressure at the vent portion of the extruder, and then the reaction mixture was extruded in a state of pellets to give modified polyolefins.

To 100 parts by weight of the modified polyolefins were added reinforcements as shown in Table 1, and the mixture was blended in a Henschel mixer. The resulting blend was melt-mixed and extruded to give pellets of composite materials. These composite materials were formed into 3 kinds of molded products, that is, plates of No. 1 dumbbell, 125×12.5×3.2 (mm), and 125×12.5×6.4 (mm) by means of a screw on-line type injection machine under molding conditions of a cylinder temperature of 220° C. and a mold temperature of 60° C.

The results obtained by measuring moldability of the composite materials and mechanical properties of molded products therefrom under the following conditions are shown in Table 1.

Melt Flow Index (hereinafter referred to as M.F.I.): ASTM-D-1238, load 2.16 kg, temperature 230° C.

Izod Impact Strength: ASTM-D-256

Heat Distortion Temperature (hereinafter referred to as HDT): ASTM-D-648

TABLE 1

| | | | Experimental No. | | | |
|---|---|---|---|---|---|---|
| | | | 1 | 2 | 3 | 4 |
| Composition of composite material | Polypropylene | Parts by weight | 100 | 100 | 100 | 100 |
| | Peroxide | Kind | — | 1,1-Bis(t-butyl-peroxy)3,3,5-trimethyl cyclohexane | 1,1-Bis(t-butyl-peroxy)3,3,5-trimethyl cyclohexane | 1,1-Bis(t-butyl-peroxy)3,3,5-trimethyl cyclohexane |
| | | Parts by weight | — | 0.2 | 0.2 | 0.1 |
| | Modifier | Kind | — | — | Maleic anhydride | Maleic anhydride |
| | | Parts by weight | — | — | 0.3 | 0.3 |
| | Reinforcement | Kind | Carbon fiber | Carbon fiber | Carbon fiber | Carbon fiber |
| | | Parts by weight | 25 | 25 | 25 | 25 |
| MFI | | g/10 min | 5.8 | 31.4 | 39.9 | 34.0 |
| Mechanical property of molded product | Flexial strength | kg/cm$^2$ | 650 | 690 | 1,060 | 990 |
| | Flexial modulus | × 10$^4$ kg/cm$^2$ | 8.0 | 8.3 | 8.7 | 9.5 |
| | Izod impact strength | kg-cm/cm$^2$ | 10.5 | 10 | 12 | 13 |
| | H.D.T. [$\eta$] | °C. | 142 | 144 | 146 | 143 |
| Remark | | | Comparsion Example | Comparison Example | Invention | Invention |
| Spherulite size of modified polypropylene | | ($\mu$) | 110 | 100 | 100 | 100 |
| Fabrication into flat plate 1 mm thick | | | Bad | Bad | Better | Better |

| | | | Experimental No. | | | |
|---|---|---|---|---|---|---|
| | | | 5 | 6 | 7 | 8 |
| Composition of composite material | Polypropylene | Parts by weight | 100 | 100 | 100 | 100 |
| | Peroxide | Kind | Benzoyl peroxide | Benzoyl peroxide | Lauroyl peroxide | Benzoyl peroxide |
| | | Parts by weight | 0.1 | 0.3 | 0.3 | 0.3 |
| | Modifier | Kind | Maleic anhydride | Maleic anhydride | Maleic anhydride | Acrylic acid |
| | | Parts by weight | 0.3 | 0.3 | 0.3 | 0.3 |
| | Reinforcement | Kind | Carbon fiber | Carbon fiber | Carbon fiber | Carbon fiber |
| | | Parts by weight | 25 | 25 | 25 | 25 |
| MFI | | g/10 min | 18.2 | 19.6 | 18.5 | 17.3 |
| Mechanical property of molded product | Flexial strength | kg/cm$^2$ | 1,060 | 1,140 | 1,110 | 1,160 |
| | Flexial modulus | × 10$^4$ kg/cm$^2$ | 8.7 | 8.8 | 8.7 | 8.6 |
| | Izod impact strength | kg-cm/cm$^2$ | 17 | 18 | 12 | 19 |
| | H.D.T. [$\eta$] | °C. | 148 | 148 | 146 | 148 |
| Remark | | | Comparison Example | Comparison Example | Comparison Example | Comparison Example |
| Spherulite size of modified polypropylene | | ($\mu$) | 10 | 10 | 100 | 10 |
| Fabrication into flat plate 1 mm thick | | | Good | Good | Good | Good |

| | | | Experimental No. | | |
|---|---|---|---|---|---|
| | | | 9 | 10 | 11 |
| Composition | Poly- | Parts by | 100 | 100 | 100 |

TABLE 1-continued

| of composite material | prolylene Peroxide | weight Kind | 1,1-Bis(t-butyl-peroxy)-3,3,5-trimethyl cyclohexane | 2,5-Dimethyl-2,5-di(t-butylperoxy)-hexane | 2,5-Dimethyl-2,5-di(t-butylperoxy)-hexane-3 |
|---|---|---|---|---|---|
| | | Parts by weight | 0.3 | 0.2 | 0.2 |
| | Modifier | Kind | Acrylic acid | Maleic anhydride | Maleic anhydride |
| | | Parts by weight | 0.3 | 0.3 | 0.3 |
| | Reinforcement | Kind | Carbon fiber | Carbon fiber | Carbon fiber |
| | | Parts by weight | 25 | 25 | 25 |
| MFI | | g/10 min | 34.6 | 33.0 | 37.3 |
| Mechanical property of molded product | Flexial strength | kg/cm$^2$ | 980 | 1030 | 1030 |
| | Flexial modulus | $\times 10^4$ kg/cm$^2$ | 8.9 | 9.2 | 9.0 |
| | Izod impact strength | kg-cm/cm$^2$ | 13 | 13 | 12 |
| | H.D.T. | °C. | 145 | 145 | 146 |
| Remark Fabrication into flat plate 1 mm thick | [η] | | Invention Best | Invention Best | Invention Best |

| | | | Experimental No. | | | |
|---|---|---|---|---|---|---|
| | | | 12 | 13 | 14 | 15 |
| Composition of composite material | Polypropylene | Parts by weight | 100 | 100 | 100 | 100 |
| | Peroxide | Kind | 1,1-Bis(t-butylperoxy)-3,3,5-trimethyl cyclohexane | 1,1-Bis(t-butylperoxy)-3,3,5-trimethyl cyclohexane | 1,1-Bis(t-butylperoxy)-3,3,5-trimethyl cyclohexane | |
| | | Parts by weight | 0.2 | 2.0 | 0.2 | 0.2 |
| | Modifier | Kind | Maleic anhydride | Maleic anhydride | Maleic anhydride | Maleic anhydride |
| | | Parts by weight | 0.3 | 0.3 | 0.7 | 0.3 |
| | Reinforcement | Kind | Carbon fiber/talc = 1/1 | Carbon fiber | Carbon fiber | Carbon fiber |
| | | Parts by weight | 50 | 25 | 25 | 25 |
| MFI | | g/10 min | 36.1 | 37.4 | 38.5 | 36.8 |
| Mechanical property of molding product | Flexial strength | kg/cm$^2$ | 1,010 | 1,040 | 1,030 | 1,050 |
| | Flexial modulus | $\times 10^4$ kg/cm$^2$ | 8.8 | 9.0 | 9.1 | 5.6 |
| | Izod impact strength | kg-cm/cm$^2$ | 10 | 11 | 12 | 13 |
| | H.D.T. | °C. | 143 | 144 | 145 | 142 |
| Spherulite size of modified polyolefin | | (μ) | 100 | 100 | 100 | 100 |
| Remark | | | Invention | Invention | Invention | Invention |

| | | | Experiment No. | | |
|---|---|---|---|---|---|
| | | | 16 | 17 | 18 |
| Composition of composite material | Polypropylene | Parts by weight | 100 | 100 | 100 |
| | Peroxide | Kind | Benzoyl peroxide | 1,1-Bis(t-butylperoxy)-3,3,5-trimethyl cyclohexane | Benzoyl peroxide |
| | | Parts by weight | 0.2 | 0.2 | 0.3 |
| | Modifier | Kind | Maleic anhydride | Maleic anhydride | Maleic anhydride |
| | | Parts by weight | 0.3 | 0.3 | 0.3 |
| | Reinforcement | Kind | Glass | Talc | Talc |

TABLE 1-continued

|  |  |  | | | |
|---|---|---|---|---|---|
|  | ment |  | fiber | | |
|  |  | Parts by weight | 25 | 25 | 25 |
| MFI |  | g/10 min | 18.0 | 35.8 | 18.4 |
| Mechanical property of molding product | Flexial strength | kg/cm$^2$ | 1,080 | 570 | 500 |
|  | Flexial modulus | $\times 10^4$ kg/cm$^2$ | 5.3 | 4.8 | 4.3 |
|  | Izod impact strength | kg-cm/cm$^2$ | 19 | 8 | 10 |
|  | H.D.T. | °C. | 14.7 | 79 | 80 |
| Spherulite size of modified polyolefin |  | (μ) | 10 | 100 | 10 |
| Remark |  |  | Comparison Example | Invention | Comparison Example |

| | | | Experiment No. | | |
|---|---|---|---|---|---|
| | | | 19 | 20 | 21 |
| Composition of composite material | Polypropylene | Parts by weight | 100 | 100 | 100 |
| | Peroxide | Kind | Benzoyl peroxide | Benzoyl peroxide | Benzoyl peroxide |
| | | Parts by weight | 0.3 | 2.0 | 0.3 |
| | Modifier | Kind | Maleic anhydride | Maleic anhydride | Maleic anhydride |
| | | Parts by weight | 0.3 | 0.3 | 0.7 |
| | Reinforcement | Kind | Carbon fiber/ talc = 1/1 | Carbon fiber | Carbon fiber |
| | | Parts by weight | 50 | 25 | 25 |
| MFI | | g/10 min | 18.1 | 17.5 | 18.6 |
| Mechanical property of molding product | Flexial strength | kg/cm$^2$ | 1,030 | 1,070 | 1,050 |
| | Flexial modulus | $\times 10^4$ kg/cm$^2$ | 8.6 | 8.8 | 8.6 |
| | Izod impact strength | kg-cm/cm$^2$ | 15 | 16 | 15 |
| | H.D.T. | °C. | 146 | 147 | 145 |
| Spherulite size of modified polyolefin | | (μ) | 10 | 10 | 10 |
| Remark | | | Comparison Example | Comparison Example | Comparison Example |

| | | | Experiment No. | | | |
|---|---|---|---|---|---|---|
| | | | 22 | 23 | 24 | 25 |
| Composition of composite material | Polypropylene | Parts by weight | 100 | 100 | 100 | 100 |
| | Peroxide | Kind | Dicumyl peracid | Dicumyl peracid | 1,1-Bis(t-butylperoxy)-3,3,5-trimethyl cyclohexane | 1,1-Bis(t-butylperoxy)-3,3,5-trimethyl cyclohexane |
| | | Parts by weight | 0.2 | 0.1 | 0.1 | 0.05 |
| | | Kind | — | Benzoyl peroxide | Benzoyl peroxide | Benzoyl peroxide |
| | | Parts by weight | — | 0.1 | 0.1 | 0.15 |
| | Modifier | Kind | Maleic anhydride | Maleic anhydride | Maleic anhydride | Maleic anhydride |
| | | Parts by weight | 0.3 | 0.3 | 0.3 | 0.3 |
| | Reinforcement | Kind | Carbon fiber | Carbon fiber | Carbon fiber | Carbon fiber |
| | | Parts by weight | 25 | 25 | 25 | 25 |
| M.F.I. | | g/10 min | 38.9 | 35.9 | 36.5 | 36.1 |
| Fabrication into flat plate 1 mm thick | | | Best | Best | Best | Best |
| Spherulite | | (μ) | 110 | 12 | 10 | 15 |

TABLE 1-continued

|  |  |  | \[cont.\] |  |  |  |
|---|---|---|---|---|---|---|
| size of modified polypropylene |  |  |  |  |  |  |
| Mechanical property of molding product | Flexyal strength | kg/cm² | 1,100 | 1,100 | 1,200 | 1,100 |
|  | Flexyal modulus | × 10⁴ kg/cm² | 8.6 | 8.6 | 8.8 | 8.7 |
|  | Izod impact strength | kg-cm/cm² | 10.5 | 18.1 | 18.5 | 17.7 |
|  | H.D.T. | °C. | 145 | 143 | 144 | 143 |
| Remark |  |  | Invention | Invention | Invention | Invention |

|  |  |  | Experiment No. | | | |
|---|---|---|---|---|---|---|
|  |  |  | 26 | 27 | 28 | 29 |
| Composition of composite material | Polypropylene | Parts by weight | 100 | 100 | 100 | 100 |
|  | Peroxide | Kind | 1,1-Bis(t-butylperoxy)-3,3,5-trimethyl cyclohexane | 2,5-Dimethyl-2,5-di(t-butylperoxy)-hexane | 1,1-Bis(t-butylperoxy)-3,3,5-dimethyl cyclohexane | 1,1-Bis(t-butylperoxy)-3,3,5-dimethyl cyclohexane |
|  |  | Parts by weight | 0.05 | 0.1 | 0.1 | 0.1 |
|  |  | Kind | Benzoyl peroxide | Benzoyl peroxide | Benzoyl peroxide | Lauroyl peroxide |
|  |  | Parts by weight | 0.05 | 0.1 | 0.1 | 0.1 |
|  | Modifier | Kind | Maleic anhydride | Maleic anhydride | Acrylic acid | Maleic anhydride |
|  |  | Parts by weight | 0.3 | 0.3 | 0.3 | 0.3 |
|  | Reinforcement | Kind | Carbon fiber | Carbon fiber | Carbon fiber | Carbon fiber |
|  |  | Parts by weight | 25 | 25 | 25 | 25 |
| M.F.I. |  | g/10 min | 34.7 | 33.5 | 34.7 | 31.7 |
| Fabrication into flat plate 1 mm thick |  |  | Best | Best | Best | Best |
| Spherulite size of modified polypropylene |  | (μ) | 10 | 10 | 10 | 110 |
| Mechanical property of molding product | Flexyal strength | kg/cm² | 1,180 | 1,110 | 1,150 | 1,100 |
|  | Flexyal modulus | × 10⁴ kg/cm² | 8.5 | 8.6 | 8.8 | 8.5 |
|  | Izod impact strength | kg-cm/cm² | 18.0 | 17.6 | 18.2 | 10.8 |
|  | H.D.T. | °C. | 145 | 143 | 144 | 144 |
| Remark |  |  | Invention | Invention | Invention | Comparative Example |

EXAMPLE 2

To 100 parts by weight of polypropylene powders having an inherent viscosity of 2.0 (measured in a tetralin solution of 135° C.) were added peroxides as shown in Table 2 and 0.3 part of maleic anhydride as a modifier, and the mixture was blended uniformly in a Henschel mixer. The mixture was then subjected to a heat-melting reaction under conditions of a reaction temperature of 250° C. and a reaction time of 7 minutes.

The results obtained by measuring the inherent viscosity of modified polypropylene thus obtained are shown in Table 2.

TABLE 2

| Peroxide | Inherent Viscosity Amount of Peroxide Added (parts) | | | | | |
|---|---|---|---|---|---|---|
|  | 0 | 0.05 | 0.1 | 0.3 | 0.4 | 0.8 |
| Benzoyl peroxide | 1.75 | 1.73 | 1.70 | 1.62 | 1.6 | 1.56 |
| 1,1-Bis(t-butylperoxy)-3,3,5-trimethyl cyclohexane | 1.75 | 1.45 | 1.3 | 1.00 | 0.95 | — |
| Dicumyl peroxide | 1.75 | 1.08 | 1.32 | 1.08 | 0.98 | — |
| Benzoyl peroxide/1,1-bis(t-butylperoxy)-3,3,5-trimethyl cyclohexane (1:1 weight ratio mixture) | 1.75 | — | 1.31 | 1.09 | — | — |

While the invention has been described in detail and with reference to specific embodiments thereof, it will be apparent to one skilled in the art that various changes and modifications can be made therein without departing from the spirit and scope thereof.

What is claimed is:

1. A polyolefin resin composition comprising:
   (1) a modified polyolefin prepared by reacting a polyolefin with an unsaturated carboxylic acid in the presence of a catalyst, and
   (2) a reinforcement;
   wherein:
   (a) the amount of the catalyst is 0.03 to 2 parts by weight per 100 parts by weight of the polyolefin;
   (b) the catalyst is a mixed catalyst system of:
      (i) a ketal peroxide or a dialkyl peroxide, said peroxides having a decomposition half life of at least 10 hours at a temperature of at least 80° C., and
      (ii) benzoyl peroxide,
   where the ratio of the ketal peroxide or the dialkyl peroxide to benzoyl peroxide is from about 1/10 to 10/1, and
   (c) the amount of the unsaturated carboxylic acid is 0.05 to 0.8 parts by weight per 100 parts of the polyolefin.

2. The polyolefin resin composition of claim 1, wherein the modified polyolefin is prepared by reacting the polyolefin and the unsaturated carboxylic acid in the presence of the catalyst in an extruder type reactor as a reactor.

3. The polyolefin resin composition of claim 1, which comprises 95 to 40 wt% of the modified polyolefin and 5 to 60 wt% of the reinforcement.

4. The polyolefin resin composition of claim 1, wherein the catalyst is at least one member selected from the group consisting of 1,1-bis(t-butylperoxy)-3,3,5-trimethyl cyclohexane, 1,1-bis(t-butylperoxy)cyclohexane, n-butyl-4,4-bis(t-butylperoxy)valerate, 2,2-bis(t-butylperoxy)butane, 2,2-bis(t-butylperoxy)octane, di-t-butyl peroxide, t-butylcumyl peroxide, dicumyl peroxide, $\alpha,\alpha'$-bis(t-butylperoxy)isopropyl)benzene, 2,5-dimethyl-2,5-di(t-butylperoxy)hexyne-3.

5. The polyolefin resin composition of claim 1, wherein the reinforcement is at least one member selected from the group consisting of fibrous inorganic reinforcements and aromatic polyamide fibers.

6. The polyolefin resin composition of claim 5, wherein the reinforcement is carbon fibers.

7. The polyolefin resin composition of claim 1, wherein the reinforcement is at least one member selected from the group consisting of glass flakes, talc, calcium carbonate, magnesium oxide, clay, mica, and carbon black.

8. The polyolefin resin composition of claim 1, wherein the modified polyolefin has the spherulite size of $50\mu$ or less.

9. The polyolefin resin composition of claim 1, wherein the improvement ratio of the strength of a molded product prepared from a polyolefin resin composition consisting of the modified polyolefin and the reinforcement to that of a molded product prepared from a polyolefin resin composition consisting of an unmodified polyolefin and a reinforcement is 1.5 or more.

10. The polyolefin resin composition of claim 1, wherein the reinforcement is an inorganic material.

* * * * *